United States Patent [19]

Onodera et al.

[11] Patent Number: 4,873,127
[45] Date of Patent: Oct. 10, 1989

[54] METHOD OF MAKING HEAT TRANSFER TUBE

[75] Inventors: Kagetoshi Onodera, Chiba; Tatsuya Koizumi; Toshiyuki Kato, both of Tokyo; Junji Sotani; Masauki Momo, both of Yokohama; Shuichi Furuya, Kawasaki, all of Japan

[73] Assignee: The Fukura Electric Company, Ltd., Tokyo, Japan

[21] Appl. No.: 211,084

[22] Filed: Jun. 21, 1988

Related U.S. Application Data

[63] Continuation of Ser. No. 77,073, Jul. 24, 1987, abandoned, which is a continuation of Ser. No. 846,606, Mar. 31, 1986, abandoned.

[30] Foreign Application Priority Data

Oct. 3, 1983 [JP] Japan ............................ 58-153468[U]
Aug. 2, 1984 [JP] Japan ............................ 59-163419
Sep. 28, 1984 [JP] Japan ............................ 59-147112[U]
Oct. 19, 1984 [JP] Japan ............................ 59-158019[U]
Feb. 18, 1985 [JP] Japan ............................ 60-21751[U]
Mar. 18, 1985 [JP] Japan ............................ 60-38634[U]
Apr. 17, 1985 [JP] Japan ............................ 60-57095[U]
Oct. 30, 1985 [JP] Japan ............................ 60-167199[U]

[51] Int. Cl.⁴ ............................ B05D 3/02; B05D 7/14

[52] U.S. Cl. ............................ 427/376.8; 427/405; 165/133; 165/180

[58] Field of Search ............................ 427/405, 376.8

[56] References Cited

U.S. PATENT DOCUMENTS 895,412 8/1908 Badger ............................ 138/142
4,537,247 8/1985 Obamoto et al. ............................ 165/133

FOREIGN PATENT DOCUMENTS 153468 4/1977 Japan .
152261 11/1979 Japan ............................ 165/180
7311787 8/1973 Netherlands ............................ 427/405

Primary Examiner—Albert W. Davis, Jr.
Attorney, Agent, or Firm—Frishauf, Holtz, Goodman & Woodward

[57] ABSTRACT

A heat transfer tube comprising an inner tube formed of copper or steel, an intermediate layer having a uniform thickness, mounted on the outer periphery of the inner tube and formed of a low melting point metal such as solder, tin or lead and an outer tube of lead or lead alloy mounted on the intermediate layer on the inner tube and metallurgically bonded with the intermediate layer when the low melting point metal is melted.

3 Claims, 5 Drawing Sheets

METHOD OF MAKING HEAT TRANSFER TUBE

This application is a continuation of application Ser. No. 077,073, filed July 24, 1987, now abandoned, which is a continuation application of Ser. No. 846,606 filed Mar. 31, 1986, now abandoned.

BACKGROUND OF THE INVENTION

The present invention relates to a lead-coated heat transfer tube and, more particularly, to a heat transfer tube having an inner tube such as a copper tube or a steel tube and an outer tube such as a lead tube or a lead alloy tube.

A heat transfer tube formed of a copper or steel tube used for a heat exchange to recover heat energy exhausted from dirty gas such as heavy oil combustion exhaust gas is known in general to be corroded due to sulfuric acid contained in the gas in a short time. Thus, a double tube in which a copper tube or an outer tube coated with a lead alloy provided on the outside of a steel tube has heretofore used. In the conventional heat transfer tube of this type, an air layer can form between the inner tube and the outer tube. If the air layer is thus formed, the heat conduction characteristic of the tube is deteriorated, and when the outer surface of the outer tube is in contact with exhaust gas at approx. 280° C. or higher, even if cooler water is flowed in the inner tube, the temperature of the outer tube reaches the same temperature as the exhaust gas temperature, with the result that the outer tube locally expands, cracks or becomes softened and melted. Thus, the conventional heat transfer tube is not satisfactory.

SUMMARY OF THE INVENTION

It is an object of the present invention to provide a heat transfer tube in which an air layer cannot be formed between an inner tube and an outer tube so that no damage to the tube will occur even if it is exposed to exhaust gas flow at a high temperature.

DETAILED DESCRIPTION OF THE PREFERRED EMBODIMENTS

Embodiments of a heat transfer tube according to the present invention will be described in detail with reference to the accompanying drawings.

Figure 1:
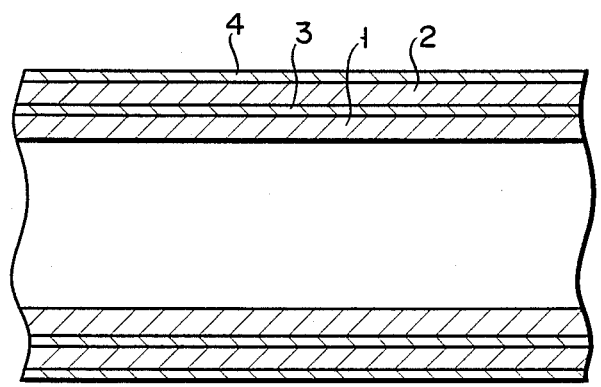
FIGS. 1 and 2 are longitudinal and lateral sectional views showing a heat transfer tube of a first embodiment according to the present invention.
Figure 2:
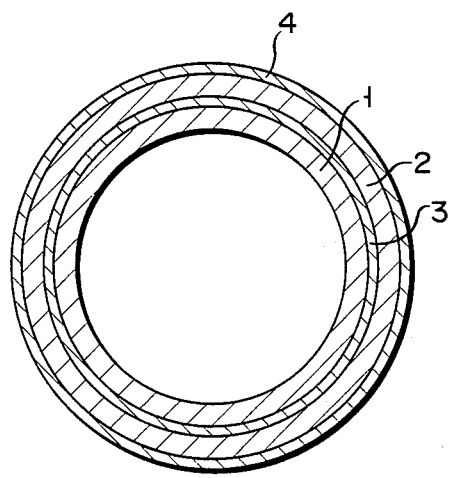

In the embodiments, substantially the same parts are denoted by the same reference numerals through the embodiments, and the description thereof will be omitted. In FIGS. 1 and 2 showing a heat transfer conduit formed of a straight tube of the first embodiment, reference numeral 1 designates inner tube made of copper or steel tube having approx. 1.2 mm or 2.0 mm of thickness. A thin or intermediate layer 3 of low melting point metal such as solder, tin or lead is formed in a uniform thickness over the entire outer peripheral surface of inner tube 1. Layer 3 is formed, for example, by pickling or polishing and then plating the outer surface of inner tube 1. Further, an outer tube 2 formed of lead or lead alloy and having approx. 1.8 mm of thickness is integrally formed by metallurgically bonded with the metal of layer 3 on the outer periphery of layer 3. Tube 2 is metallurgically bonded with layer 3 by heating layer 3 to form the surface in a melted state and coating lead or lead alloy. The outer periphery of tube 2 is, though this is not always necessary, formed with a protective layer 4 formed, for example, of a stainless steel having approx. 1.0 mm of thickness. Layer 4 may be formed of any heat-resistant and acid-resistant material having a hardness not damaged even if dusts of hard particles are strongly collided with the layer or of, for example, titanium tube or a stainless steel tape.

Figure 3:
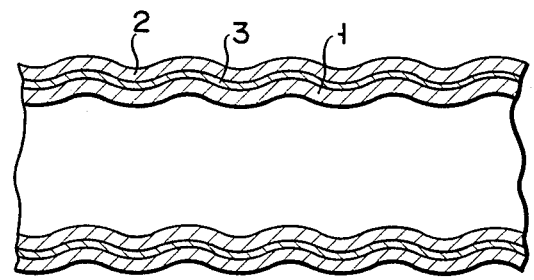
FIG. 3 is a longitudinal sectional view showing a heat transfer tube of a second embodiment according to the present invention.

A heat transfer tube of second embodiment shown in FIG. 3 is formed in a wavy shape to increase the area to be contacted with exhaust gas, thereby increasing the heat exchange efficiency.

Figure 4:
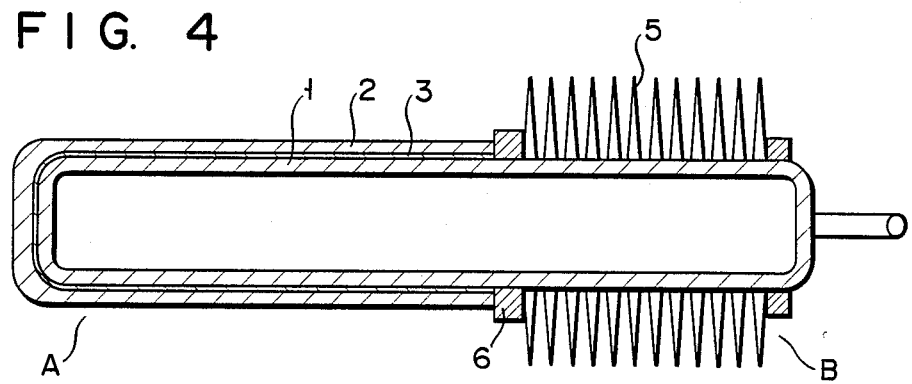
FIG. 4 is a longitudinal sectional view showing a heat transfer tube of a third embodiment according to the present invention.

A third embodiment shown in FIG. 4 is formed to be optimum as a heat pipe, in which a thin layer 3 of 10 to 50 micron is formed by soldering on the surface of tube 1 made of copper at high temperature side A, a Pb-Sn-Sb alloy is coated on the outer periphery by a sheathing machine to form tube 2 having 1.6 to 2.0 mm of thickness. Further, a fin 5 of aluminum is formed on the outer surface of tube 1 at low temperature side B. Reference numeral 6 designates a tubular plate.

Figure 5:
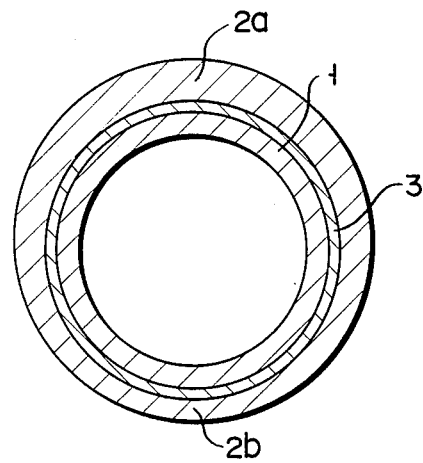
FIG. 5 is a longitudinal sectional view showing a heat transfer tube of a fourth embodiment according to the present invention.

A fourth embodiment shown in FIG. 5 is adapted for use by bending in such a manner that the thickness of tube 2 is radially partly varied. In other words, portion 2a of tube 2 disposed outside when bending is increased in thickness as compared with portion 2b of tube 2. In this embodiment, the thickness of thick portion 2a has 1.8 to 2.3 mm, and thin portion 2b has 1.6 to 1.8 mm. The ratio of thick portion 2a to thin portion 2b is preferably approximately 1:1 to 1.3. In this embodiment, when the tube is bent at 180°, thick portion 2a of tube 2 is subjected to tension in the state contacted with tube 1, elongated to be thinned to become substantially the same thickness as thin portion 2b. This did not buckle and could be preferably finished.

Figure 6:
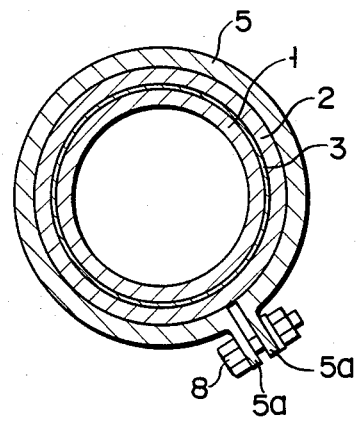
FIGS. 6 to 9 are lateral sectional views showing heat transfer tubes of fifth to eighth embodiments having a protective layer according to the invention.
Figure 7:
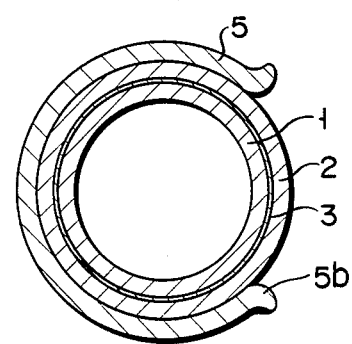
Figure 8:
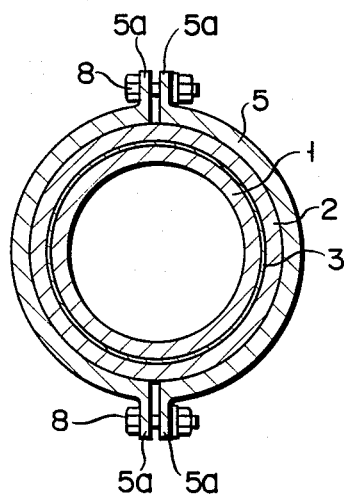
Figure 9:
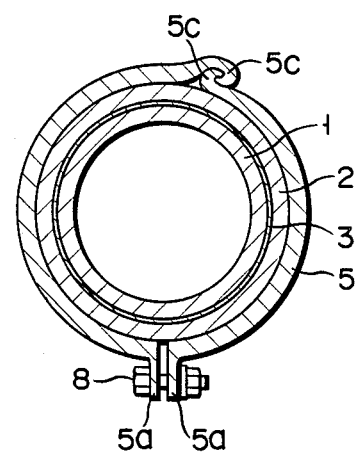

In fifth to eighth embodiments shown in FIGS. 6 to 9, construction is the same as that of first embodiment except that protective layer 5 is detachably formed on the outer tube. Layer 5 shown in FIG. 6 is formed with a longitudinally split groove, and a pair of flanges 5a are formed along the groove in a cylindrical stainless steel tube. Flanges 5a are clamped by clamping members 8 such as bolts and nuts to fasten the stainless steel tube to the outer periphery of tube 2. When layer 5 is replaced, members 8 may be removed. Layer 5 shown in FIG. 7 is formed with slit 5b in the entire length of a stainless steel tube of not complete cylindrical shape. Layer 5 of this embodiment has an elasticity to radially expand, and the outer periphery of tube 2 is fastened by the elasticity. In actual use, it is necessary not to dispose slit 5b at the side that exhaust gas flows. Layer 5 shown in FIG. 8 is formed of a pair of semicylindrical stainless steel body formed with flanges 5a along both edges. Flanges 5a may be clamped and fastened integrally with tube 2 by clamping members 8 similarly to that shown in FIG. 6. Layer 5 shown in FIG. 9 is formed with flanges 5a along one edge and a pair of semicylindrical stainless steel bodies formed with connecting portions 5c along the other edge. Portions 5c are engaged and clamped at flanges 5a by clamping members 8 to tube 2.

Figure 10:
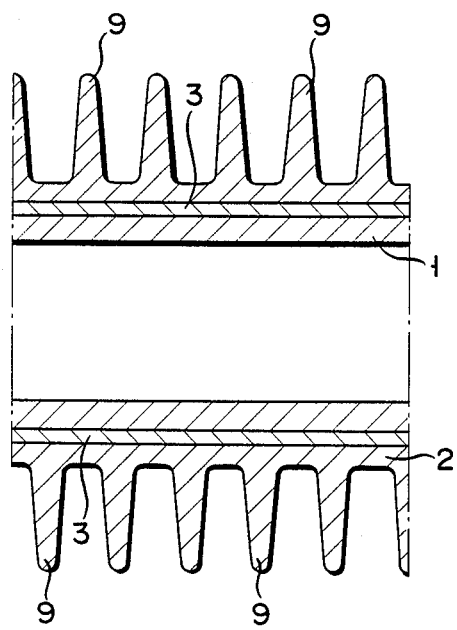
FIGS. 10 and 11 are longitudinal sectional views showing heat transfer tubes of ninth and tenth embodiments formed with a fin according to the invention.

In a ninth embodiment shown in FIG. 10, spiral fin 9 is formed by forging on the outer surface of tube 2.

Figure 11:
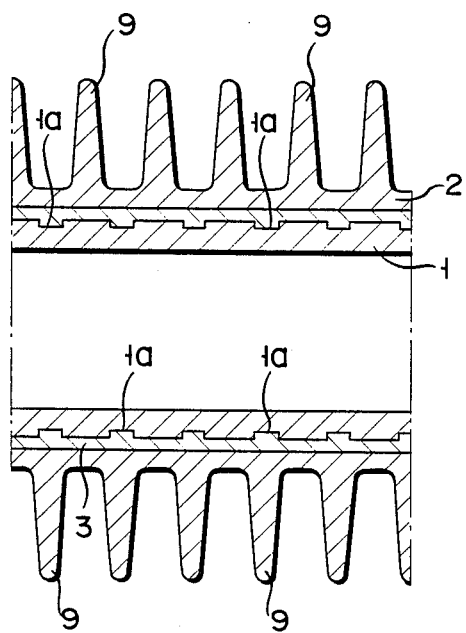

In a tenth embodiment shown in FIG. 11, in order to preferably mount layer 3 formed of low melting point metal and tube 4, a number of grooves 1a are formed in advance on the outer surface of tube 1. The outer surface of tube 1 may be mechanically roughed instead of forming grooves 1a. Fin 9 is not limited to that elongated circumferentially of tube 2. For example, fin 9 maybe axially elongated.

A method of manufacturing the heat transfer tube constructed as described above as shown in FIG. 1 will be described with reference to FIGS. 12 and 13.

Figure 12:
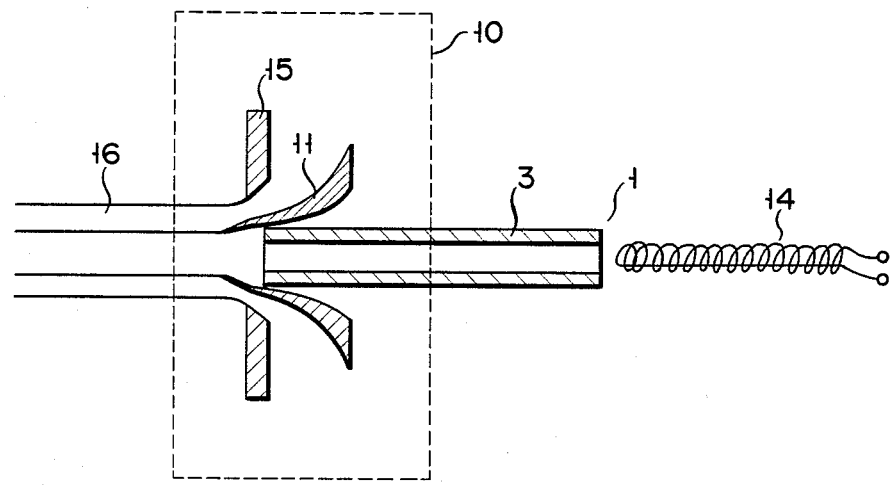
FIGS. 12 and 13 are schematic views for explaining an example of a method of manufacturing a heat transfer tube of the embodiments according to the invention.
Figure 13:
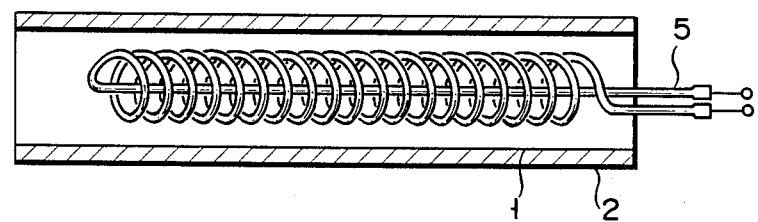

As shown in FIG. 12, tube 1 on which layer 3 made of soldering layer having 50 micron of thickness is formed on the outer periphery is inserted into extrusion nipple 11 of sheathing machine 10, and flexible heater 14 is then inserted into tube 1 as shown in FIG. 13. Then, electric power is supplied to heater 14 to heat layer 3 until its plating is melted. When melted, lead alloy 16 is immediately extruded between extrusion die 15 and nipple 11 to coat it on tube 1 in uniform thickness on the outer periphery of layer 2 in manufacturing the heat transfer tube of the invention.

When the heater is continuously supplied with power, plating of layer 3 is completely melted and the outer tube cannot be formed. Thus, when layer 3 starts melting, it is necessary to immediately stop supplying power to heater or to remove the heater from the inner tube.

In order to test the performances of the heat transfer tube of the invention constructed as described above and the conventional heat transfer tube in which an outer tube is directly disposed on an inner tube, both tubes are placed for 50 hours in a constant-temperature oven at 50° C. Then, the heat transfer tube of the invention exhibits no abnormality, but the conventional tube develops a gap between the inner tube and the outer tube, and a decrease in sealability is observed.

According to the invention as described above, the heat transfer tube provides the following advantages.

1. Since the sealability between the inner tube and the outer tube is improved, thermal resistance decreases and thermal conductivity increases.

2. Since no air layer is formed between the inner tube and the outer tube, the surface temperature of the outer tube is always higher by approx. 10° C. than that of water flowing in the inner tube, and the outer tube is not resultantly locally deteriorated.

3. The outer tube is not locally expanded, the sheath of lead sulfate formed on the outer tube is not separated but can be used for a long period.

4. When water flows in the inner tube, the outer tube is not damaged even if it is exposed to an atmosphere of 450° C.

What is claimed is:

1. A method of manufacturing a heat transfer tube, comprising the steps of:
    placing an intermediate metal layer having a low melting point around an inner tube formed of copper or steel;
    heating the intermediate layer to a temperature above its melting point to metalurgically bond it to the inner tube; and
    coating the molten intermediate layer with lead or a lead alloy while the intermediate layer is in a molten state to form an outer layer around the inner tube.

2. The method of claim 1, wherein the coating step is performed after heating of the intermediate layer is stopped.

3. The method of claim 2, wherein said step of heating the intermediate layer is performed by inserting a heater into the inner tube.

* * * * *

UNITED STATES PATENT AND TRADEMARK OFFICE
CERTIFICATE OF CORRECTION

PATENT NO. : 4,873,127
DATED : October 10, 1989
INVENTOR(S) : ONODERA et al

It is certified that error appears in the above-identified patent and that said Letters Patent is hereby corrected as shown below:

In the title page, the name of the Assignee should read:

--The Furukawa Electric Co., Ltd.--

Signed and Sealed this

Twenty-fourth Day of December, 1991

Attest:

HARRY F. MANBECK, JR.

*Attesting Officer*     *Commissioner of Patents and Trademarks*